(12) United States Patent
Gardner et al.

(10) Patent No.: US 10,111,409 B2
(45) Date of Patent: Oct. 30, 2018

(54) REMOTE-CONTROLLED ANIMAL RELEASE DEVICE

(71) Applicants: Scott Alan Gardner, East Bethel, MN (US); Vicki C. Martens, Neola, IA (US)

(72) Inventors: Scott Alan Gardner, East Bethel, MN (US); Vicki C. Martens, Neola, IA (US)

(73) Assignee: Scott Gardner Design LLC, East Bethel, MN (US)

( * ) Notice: Subject to any disclaimer, the term of this patent is extended or adjusted under 35 U.S.C. 154(b) by 0 days.

(21) Appl. No.: 15/438,665

(22) Filed: Feb. 21, 2017

(65) Prior Publication Data

US 2018/0235180 A1    Aug. 23, 2018

(51) Int. Cl.
*A01K 27/00* (2006.01)
*F16B 45/02* (2006.01)

(52) U.S. Cl.
CPC .......... *A01K 27/005* (2013.01); *F16B 45/025* (2013.01)

(58) Field of Classification Search
CPC .... A01K 27/00; A01K 27/003; A01K 27/005; A01K 27/009; F16B 45/025
USPC .......................... 119/769, 772, 776; 74/469; 294/82.3–82.33
See application file for complete search history.

(56) References Cited

U.S. PATENT DOCUMENTS

| | | |
|---|---|---|
| 2,800,104 A | 7/1957 | Cameron |
| 3,104,909 A | 9/1963 | Walker |
| 3,336,005 A | 8/1967 | Dickerman |
| 3,505,979 A | 4/1970 | Rosswag |
| 3,733,530 A | 5/1973 | Labart et al. |
| 4,074,247 A | 2/1978 | Carvalho |
| 4,149,492 A * | 4/1979 | Kovacs ................ A01K 27/005 119/774 |
| 4,898,119 A | 2/1990 | Tsai |
| 4,903,638 A * | 2/1990 | Lacey .................. A01K 27/005 119/776 |
| 5,100,192 A * | 3/1992 | McMillan ............... B63B 21/04 294/82.31 |
| 5,103,771 A * | 4/1992 | Lee ...................... A01K 27/005 119/776 |
| RE34,351 E | 8/1993 | Lacey |
| 5,261,260 A | 11/1993 | Lin |

(Continued)

FOREIGN PATENT DOCUMENTS

| | | | | |
|---|---|---|---|---|
| CA | 2413320 A1 * | 6/2003 | .......... | A01K 15/003 |
| DE | 202014002889 U1 * | 5/2014 | .......... | A01K 27/005 |

(Continued)

OTHER PUBLICATIONS

FR2582766 to Galibert, translation obtained from WIPO.*

*Primary Examiner* — Marc Burgess
*Assistant Examiner* — Morgan T Barlow
(74) *Attorney, Agent, or Firm* — Patterson Thuente Pedersen, P.A.

(57) ABSTRACT

A remotely-controlled animal release device for releasing a dog from a chain to chase off intruders. The remotely-controlled animal release device includes a support assembly including a support member; a catch assembly in communication with the support member for releaseably retaining an animal with up to 300 pounds of tension; and an actuating assembly in communication with the catch assembly for releasing the animal from a restraint.

7 Claims, 2 Drawing Sheets

(56) References Cited

U.S. PATENT DOCUMENTS

| | | | |
|---|---|---|---|
| 5,450,820 A | 9/1995 | Kirsch | |
| 5,534,852 A * | 7/1996 | Schuett | A01K 15/02 318/16 |
| 5,901,990 A * | 5/1999 | McMillan | B63B 21/04 292/195 |
| 6,352,053 B1 * | 3/2002 | Records | A01K 15/003 119/712 |
| 6,578,885 B1 | 6/2003 | Tillman | |
| 6,629,511 B2 | 10/2003 | De Bien | |
| 7,574,979 B2 | 8/2009 | Nottingham et al. | |
| 7,640,639 B2 * | 1/2010 | de Bien | A01K 27/005 119/772 |
| 7,828,180 B2 * | 11/2010 | Slesar | A45F 5/02 119/776 |
| 7,954,211 B2 | 6/2011 | De Bien | |
| 8,151,734 B1 * | 4/2012 | Foley | A01K 15/027 119/702 |
| 8,196,377 B1 * | 6/2012 | Putty | B68C 1/00 24/603 |
| 9,071,387 B1 | 6/2015 | Dunnigan | |
| 2003/0102679 A1 * | 6/2003 | Tillman | A01K 15/003 292/201 |
| 2003/0204984 A1 * | 11/2003 | Brickett | A01K 27/005 43/4.5 |
| 2008/0216764 A1 * | 9/2008 | Porter | A01K 1/0236 119/712 |
| 2011/0197824 A1 * | 8/2011 | Reese | A01K 27/004 119/720 |
| 2012/0240867 A1 * | 9/2012 | Flynn | A01K 1/04 119/721 |
| 2013/0185901 A1 * | 7/2013 | Heyman | A01K 27/005 24/303 |
| 2016/0286764 A1 * | 10/2016 | Clark | A01K 27/003 |

FOREIGN PATENT DOCUMENTS

| | | | | |
|---|---|---|---|---|
| DE | 202015003787 U1 * | 7/2015 | | A01K 27/005 |
| FR | 838254 A * | 3/1939 | | A01K 27/005 |
| FR | 1029721 A * | 6/1953 | | A01K 27/005 |
| FR | 2582766 A1 * | 12/1986 | | A01K 27/005 |
| FR | 2662577 A1 * | 12/1991 | | A01K 27/005 |
| GB | 2368644 A * | 5/2002 | | G01L 5/0033 |
| GB | 2368644 A * | 5/2002 | | G01L 5/0033 |
| WO | WO-9732143 A1 * | 9/1997 | | A01K 27/001 |
| WO | WO-2011064503 A1 * | 6/2011 | | A01K 27/005 |
| WO | WO-2014087788 A1 * | 6/2014 | | A01K 27/005 |

\* cited by examiner

REMOTE-CONTROLLED ANIMAL RELEASE DEVICE

BACKGROUND OF THE INVENTION

Field of the Invention

The present invention relates to animal releases and more particularly pertains to a new remotely-controlled animal release device for releasing a dog from a chain to chase off intruders.

Description of the Prior Art

The use of animal releases is known in the prior art. More specifically, animal releases heretofore devised and utilized are known to consist basically of familiar, expected and obvious structural configurations, notwithstanding the myriad of designs encompassed by the crowded prior art which have been developed for the fulfillment of countless objectives and requirements.

SUMMARY OF THE INVENTION

The general purpose of the present invention, which will be described subsequently in greater detail, is to provide a new remotely-controlled animal release device which has many of the advantages of the animal releases mentioned heretofore and many novel features that result in a new remotely-controlled animal release device which is not anticipated, rendered obvious, suggested, or even implied by any of the prior art animal releases, either alone or in any combination thereof. The present invention includes a support assembly including a support member; a catch assembly in communication with the support member for releaseably retaining an animal with up to 300 pounds of tension; and an actuating assembly in communication with the catch assembly for releasing the animal from a restraint. None of the prior art includes the combination of the elements of the present invention.

There has thus been outlined, rather broadly, the more important features of the remotely-controlled animal release device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new remotely-controlled animal release device which has many of the advantages of the animal releases mentioned heretofore and many novel features that result in a new remotely-controlled animal release device which is not anticipated, rendered obvious, suggested, or even implied by any of the prior art animal releases, either alone or in any combination thereof.

Still another object of the present invention is to provide a new remotely-controlled animal release device for releasing a dog from a chain to chase off intruders.

Still yet another object of the present invention is to provide a new remotely-controlled animal release device that effectively restrains a dog up to 300 pounds.

Even still another object of the present invention is to provide a new remotely-controlled animal release device that allows a user to have a large guard dog properly restrained and to protect one's property by remotely releasing the dog to confront intruders trespassing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
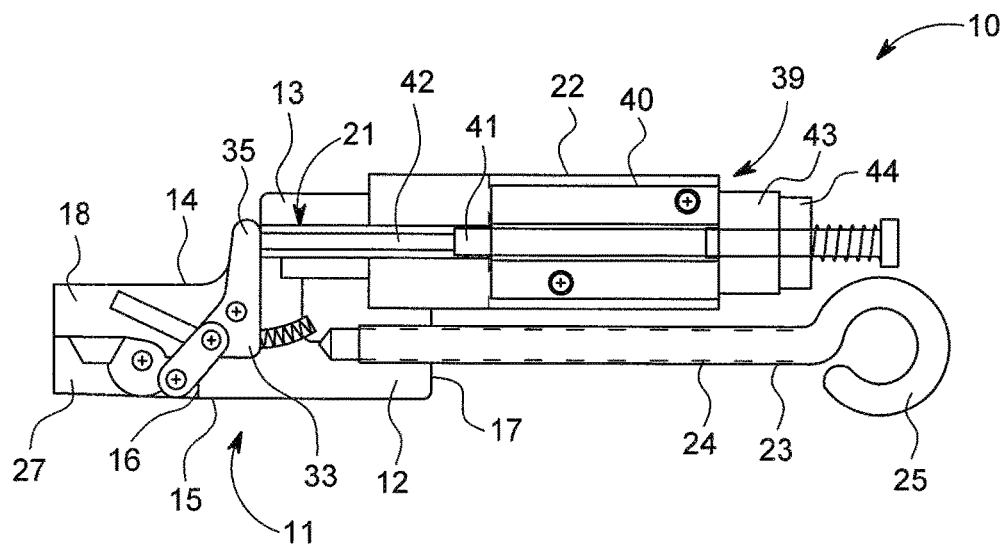
FIG. 1 is a side cross-sectional view of a new remotely-controlled animal release device according to the present invention in a locked position.
Figure 2:
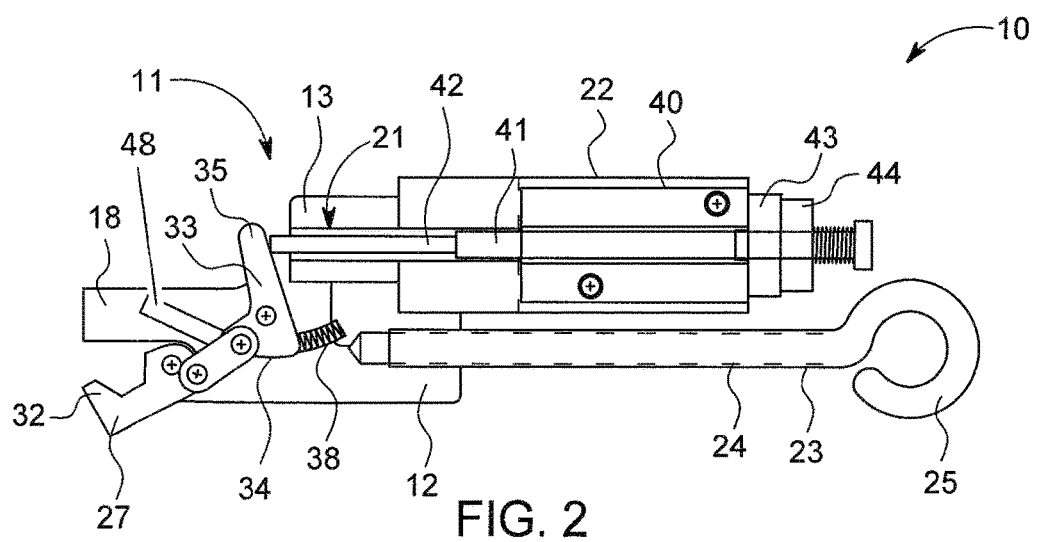
FIG. 2 is another side cross-sectional view of the present invention in a released position.
Figure 3:
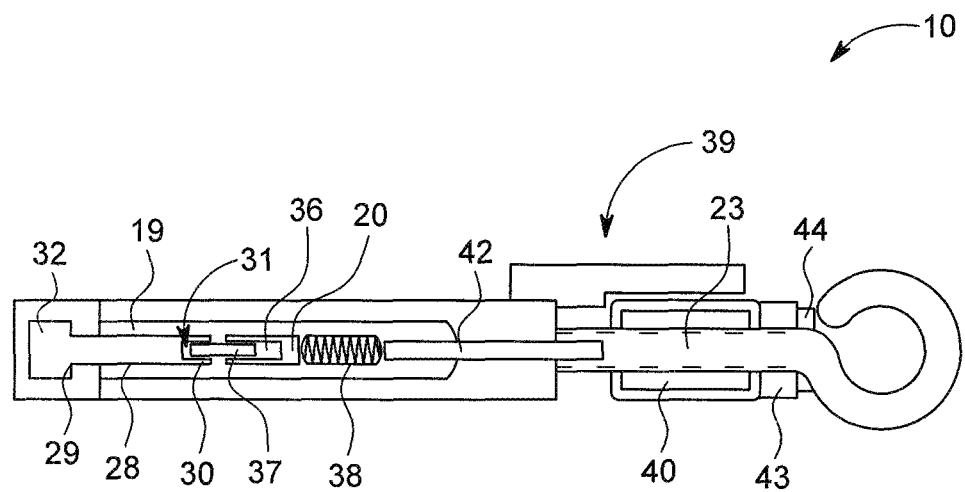
FIG. 3 is a top plan view of the present invention.
Figure 4:
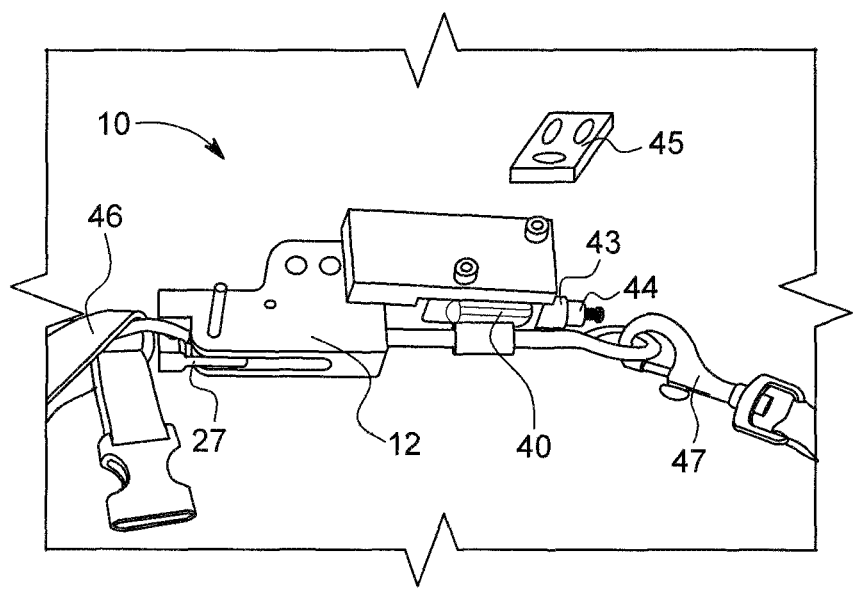
FIG. 4 is a perspective view of the present invention in use.

With reference now to the drawings, and in particular to FIGS. 1 through 4 thereof, a new remotely-controlled animal release device embodying the principles and concepts of the present invention and generally designated by the reference numeral 10 will be described.

As best illustrated in FIGS. 1 through 4, the remotely-controlled animal release device 10 generally comprises a support assembly 11 including a support member 12; a catch assembly 26 in communication with the support member 12 for releaseably retaining an animal with up to 300 pounds of tension; and an actuating assembly 39 in communication with the catch assembly 26 for releasing the animal from a restraint 47. The support member 12 includes a solid elongated body 13 having a tongue portion 18 and a longitudinal slot 19 disposed in the elongated body 13 and a first bore 20 disposed laterally through the elongated body 13 and the longitudinal slot 19. The elongated body 13 has a bottom 15, a top 14, a front end 16 and a back end 17 with the longitudinal slot 19 disposed in the bottom 15 and in the front end 16 with the tongue portion 18 integrally extending outwardly from the front end 16. The support assembly 11 also includes a restraint connector 23 conventionally coupled and threaded to the elongated body 13 for connecting to the restraint 47. The restraint connector 23 is an eye bolt having a shaft 41 threaded into the back end 17 of the elongated body 13 and also having an eyelet 25 integral to the threaded shaft 24 to which the restraint 47 is removably connected.

The catch assembly 26 includes a catch member 27 conventionally and pivotably coupled to the elongated body 13 and engagable with the tongue portion 18 to retain an animal hardware 46 such as a collar or harness between the catch member 27 and the elongated body 13. The catch assembly 26 also includes a trigger 33 conventionally and pivotably coupled to the elongated body 13 in the first bore 20 and further includes a linkage 37 conventionally and pivotably connected to the trigger 33 and to the catch member 27. The catch member 27 is a lever having a main portion 28 with a back end 30 and a front end 29 and a slot 31 disposed in the back end 30, and also having a jaw portion 32 integrally extending from the front end 29 and being engagable with the tongue portion 18. The main portion 28 is conventionally and pivotably disposed in the longitudinal slot 19 of the elongated body 13 and the jaw portion 32 extends forwardly of the front end 16 of the elongated body 13 and is angled toward the tongue portion 18 and relative to the main portion 28 of the lever. The trigger 33 includes a first end 34 having a slot 36 disposed therein and also having a second end 35 removably abutting against the elongated body 13 to prevent the catch member 27 disengaging from the tongue portion 18. The linkage 37 is conventionally and pivotably disposed in the slots 31, 36 of the catch member 27 and the trigger 33, and in cooperation with the trigger 33 either securely engages the catch member 27 with the tongue portion 18 up to 300 pounds of tension or disengages the catch member 27 from the tongue portion 18 by pivoting the catch member 27 which disengages the catch member 27 from the tongue portion 18. The catch assembly 26 further includes a biased element 38 conventionally disposed in the longitudinal slot 19 and engaged to the trigger 33 and to the elongated body 13 to biasedly engage the catch member 27 with the tongue portion 18. The catch assembly 26 also includes a set screw 48 threaded into the elongated body 13 and in communication with the trigger 33 to facilitate releaseably locking the catch member 27 to the tongue portion 18. The support member 12 further includes a second bore 21 extending longitudinally through the elongated body 13 proximate to the trigger 33.

The actuating assembly 39 includes a linear actuator 40 such as a solenoid valve conventionally supported upon the elongated body 13 and having a linear-moving shaft 41 for disengaging the catch member 27 from the tongue portion 18, and also includes a connecting rod 42 slidably disposed in the second bore 21 and engagable with the second end 35 of the trigger 33 and with the shaft 41 to actuate and pivot the trigger 33 which disengages the catch member 27 from the tongue portion 18 to release the animal from the restraint 47. The elongated body 13 has a rearwardly-depending extension 22 with the linear actuator 40 conventionally supported upon the extension 22. The actuating assembly 39 further includes a receiver 43 in conventional communication with the linear actuator 40 and also includes a power source 44 such as a battery pack in conventional communication with the receiver 43 and the linear actuator 40 and further includes a transmitter 45 in radio communication with the receiver 43 for energizing the linear actuator 40. The linear-moving shaft 41 is biasedly retracted with a spring member toward the linear actuator 40 and away from the trigger 33 when the linear actuator 40 is not energized.

In use, the user connects the restraint 47 such as a dog chain to the restraint support 23 and positions the animal hardware 46 such as a collar or harness between the catch member 27 and the support member 12. The restraint 47 allows the animal to move about within the length of the restraint 47. However, if for security purposes the user may need to release the animal so that the animal can freely attend to the security breach and the user does this by activating the transmitter 45 which send a radio signal to the receiver 43 which energizes the linear actuator to move the shaft 41 and the connecting rod 42 into engagement with the trigger 33 which pivots the linkage 37 which in turn pivots the catch member 27 causing the catch member 27 to disengage from the tongue portion 18 releasing the animal hardware 46 from between the catch member 27 and the elongated body 13 and allowing the animal to run to the security breach. The remotely-controlled animal release device 10 is able to withstand up to 300 pounds of tension so that the animal cannot tear away from the remotely-controlled animal release device 10 prematurely or without the user activating the linear actuator 40.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the remotely-controlled animal release device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A remotely-controlled animal release device, comprising:
   a remotely controllable linear actuator; and
   a catch assembly, including—
      a support member defining a tongue portion;
      a catch member pivotably coupled to the support member and having a first end and a second end having a slot disposed therein, the first end defining an extending jaw portion, wherein the catch member is configured to act as a lever to selectively engage with the tongue portion of the support member with a clamping force sufficient to retain hardware under tension therebetween;
      a trigger pivotably coupled to the support member and having a first end having a slot disposed therein and a second end removably abutting against the a portion of the support member in an engaged position to prevent the catch member disengaging from the tongue portion, the second end being shiftable away from the portion of the support member in a released position through direct contact with the linear actuator to disengage the catch member from the tongue portion; and a linkage pivotably disposed in the slots of the catch member and the trigger, thereby connecting the first end of the trigger to the second end of the catch member; and a biasing element operably coupling the support member to the first end of the trigger, the biasing element configured to bias the trigger to the engaged position.

2. The remotely-controlled animal release device of claim 1, wherein the linkage, in cooperation with the trigger, securely engages the catch member with the tongue portion in the engaged position, and disengages the catch member from the tongue portion in the released position.

3. The remotely-controlled animal release device of claim 1, wherein the catch assembly is configured to retain hardware under tension of up to 300 pounds in the engaged position.

4. The remotely-controlled animal release device of claim 1, wherein the remotely controllable linear actuator is operably coupled to the support member and has a linear-moving shaft engageable with the second end of the trigger to pivot the trigger relative to the support member from the engaged position to the released position.

5. The remotely-controlled animal release device of claim 1, further comprising a receiver in communication with the remotely controllable linear actuator and a power source in communication with the receiver for energizing the remotely controllable linear actuator.

6. The remotely-controlled animal release device of claim 5, wherein the linear-moving shaft is biased away from the trigger when the remotely controllable linear actuator is not energized.

7. The remotely-controlled animal release device of claim 5, further comprising a transmitter in radio communication with the receiver.

* * * * *